(12) United States Patent
Bronold et al.

(10) Patent No.: US 6,441,624 B1
(45) Date of Patent: Aug. 27, 2002

(54) EXPERIMENTING APPARATUS FOR FUEL CELL TECHNOLOGY

(75) Inventors: Matthias Bronold; Henrik Colell, both of Berlin (DE)

(73) Assignee: Heliocentris Energiesysteme GmbH, Berlin (DE)

( * ) Notice: Subject to any disclaimer, the term of this patent is extended or adjusted under 35 U.S.C. 154(b) by 0 days.

(21) Appl. No.: 09/618,125

(22) Filed: Jul. 17, 2000

(30) Foreign Application Priority Data

Jul. 15, 1999 (DE) .......................................... 299 12 681

(51) Int. Cl.[7] .............................................. G01R 27/08
(52) U.S. Cl. ...................... 324/691; 324/426; 204/228; 361/93.1
(58) Field of Search ................................. 324/426, 428, 324/431, 691, 425, 429, 713; 73/23.3; 361/93.1, 93.2; 204/228, 406

(56) References Cited

U.S. PATENT DOCUMENTS

| 3,909,708 | A | * | 9/1975 | Champlin | 324/431 |
| 4,770,026 | A | * | 9/1988 | Wolf | 73/23.3 |
| 4,816,768 | A | * | 3/1989 | Champlin | 324/428 |
| 5,512,831 | A | * | 4/1996 | Cisar | 324/426 |

* cited by examiner

*Primary Examiner*—Michael J. Sherry
*Assistant Examiner*—Trung Nguyen
(74) *Attorney, Agent, or Firm*—Laurence A. Greenberg; Werner H. Stemer; Ralph E. Locher

(57) ABSTRACT

An experimental apparatus for determining characteristics, including the power, of fuel cells. The apparatus contains at least three and a maximum of 15 resistors, whose resistance correspond to a profile of the characteristic to be expected. In addition, an ammeter and a voltmeter with a maximum of two measurement ranges which are typical of the power range corresponding to one or more fuel cells is provided. This makes it considerably easier to carry out experiments, particularly by trainees with little prior training.

10 Claims, 2 Drawing Sheets

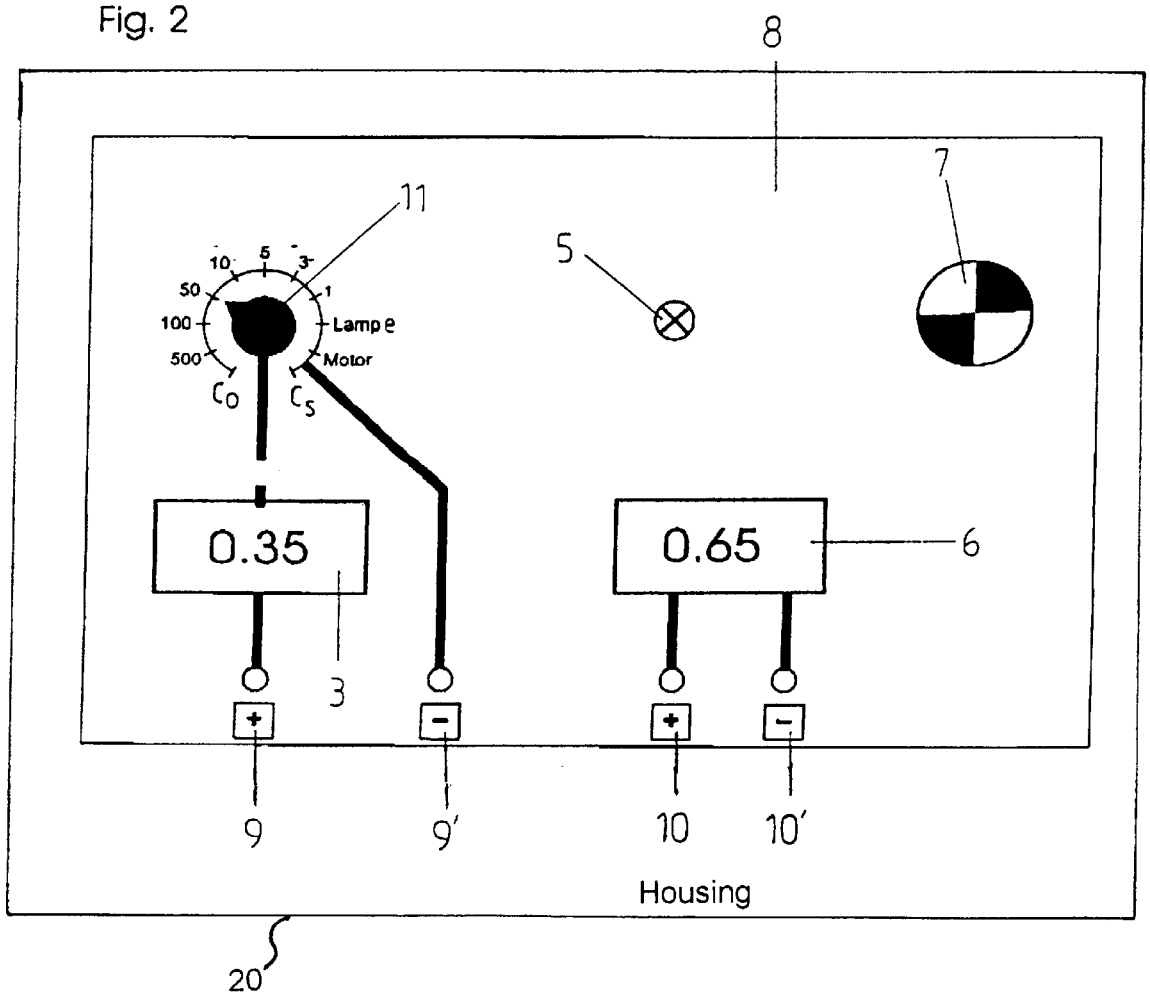

EXPERIMENTING APPARATUS FOR FUEL CELL TECHNOLOGY

BACKGROUND OF THE INVENTION

FIELD OF THE INVENTION

The invention relates to an experimenting apparatus for fuel cell technology, which contains a fuel cell having a fuel source and, for experimental determination of the power and of the characteristic of the fuel cell, a number of resistors as electrical loads as well as an ammeter and a voltmeter.

In terms of teaching and training, the measurement of the power and the characteristic of fuel cells are among the experiments which are normally carried out in order to illustrate the principles of fuel cell technology to trainees. The experimental apparatuses used for this purpose use conventional multimeters with numerous measurement ranges for current, voltage and resistance, whose performance range is very wide and thus, in fact, makes it rather difficult, particularly for students in lower classes, to carry out experiments. The determination of the characteristic, for which the test equipment described above is used to measure the voltage for various resistances and is plotted against the current level, is associated with additional difficulties for the trainee since numerous resistors, which are connected by rotary or slide switches to form resistor decades, are used for this purpose having an adjustment range and an accuracy which make it hard to carry out experiments easily and clearly and, furthermore, which are associated with high procurement costs.

SUMMARY OF THE INVENTION

It is accordingly an object of the invention to provide an experimenting apparatus for fuel cell technology, that overcomes the above-mentioned disadvantages of the prior art devices of this general type, which can be operated easily and clearly and can be provided at low cost.

With the foregoing and other objects in view there is provided, in accordance with the invention, an experimenting apparatus for fuel cell technology containing a fuel cell having a fuel source and operating characteristics including a current range, a voltage range, and a power range. At least three and a maximum of 15 resistors having resistances are selectively connected to the fuel cell and function as electrical loads. The resistances correspond to an expected profile of the operating characteristics of the fuel cell. An ammeter is connected to the fuel cell and has a maximum of two measurement ranges corresponding to the power range, the voltage range and the current range of the fuel cell. A voltmeter having a maximum of two measurement ranges corresponding to the power range, the current range, and the voltage range of the fuel cell is connected to the fuel cell. The resistors, the ammeter and the voltmeter are provided for an experimental determination of the operating characteristics of the fuel cell.

The fundamental idea of the invention is that an ammeter and a voltmeter with a maximum of two measurement ranges are provided, corresponding to the power range of the fuel cell or a number of fuel cells connected in parallel or in series and at least three, but a maximum of 15 resistors, each having a resistance matched to the expected characteristic profile.

An experimental apparatus which is limited in terms of test equipment and resistors in such a way can on the one hand be provided at low cost and makes it considerably easier to carry out experiments since, depending on the performance range, only one of a maximum of two test equipment measurement ranges need be selected. Therefore, only a small number of resistors with steps corresponding to the expected characteristic profile are required to determine the characteristic of the fuel cell. When carrying out experiments, the trainees can concentrate on the correct layout of the measurement configuration in conjunction with the fuel cell, the fuel source and the load, and carrying out the measurement itself and do not have to concern themselves with the complicated choice of numerous measurement ranges for the current, voltage and resistance required with conventional multimeters, and which may considerably influence how the experiment is carried out by those with little prior training.

A feature which considerably simplifies the experimenting apparatus is to use only three resistors, which are sufficient to achieve sufficiently accurate results for teaching purposes. A further important feature is that at least one resistance between 0.5 and 5 $\Omega$, one resistance between 5 and 50 $\Omega$ and one resistance between 50 and 500 $\Omega$ are located in a resistor chain. In general, the resistances of the resistors are in steps between 0.5 and 600 ohms. Alternatively, the number of the resistors can be twelve resistors having resistance values of 0.5, 1, 2, 3, 5, 10, 20, 50, 100, 200, 400 and 600 ohms.

In accordance with an added feature of the invention, the ammeter has a first measurement range with maximum values of up to 0.5 amperes, and a second measurement range with maximum values between 0.5 and 5 amperes for measuring a current. Accordingly, the voltmeter also has a first measurement range with maximum values of up to 2 volts, and a second measurement range with maximum values between 5 and 20 volts for measuring a voltage.

In accordance with an additional feature of the invention, there is a lamp and an electric motor as further electrical loads that are selectively connected to the fuel cell.

In an advantageous development of the invention, the resistors and the ammeter are disposed on the same board, and are preferably linked by a rotary switch. Connecting sockets for the fuel cell and the voltmeter are also provided on the board. More specifically, the rotary switch fitted on the board, the electrical loads, the further electrical loads and the ammeter are disposed and electrically connected to one another on the board. The electrical loads and the further electrical loads are connected to the rotary switch and selectively connected to the fuel cell through the rotary switch. The board has a short-circuit terminal and an open-circuit terminal connected to the rotary switch. The fuel cell can be switched to the short-circuited terminal through the rotary switch for testing a short-circuit condition, and the fuel cell can be switched to the open-circuit terminal being open contacts for measuring a no-load voltage.

The board, on which other electrical loads, such as a lamp and/or an electric motor, can be fitted, is preferably accommodated in a housing in order to protect the components disposed on it.

In accordance with another feature of the invention, the fuel source is an electrolyzer that is to be connected to a solar module and/or a gas reservoir.

In accordance with a concomitant feature of the invention, the fuel cell is one of a plurality of fuel cells and the two measurement ranges of the ammeter and the voltmeter are configured for the characteristics of the plurality of fuel cells.

Other features which are considered as characteristic for the invention are set forth in the appended claims.

Although the invention is illustrated and described herein as embodied in an experimenting apparatus for fuel cell technology, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is an illustration of a board, which is provided for connection to the fuel cell, with various resistors which can be connected via a selector switch, and other electrical loads such as an ammeter and a voltmeter.

DESCRIPTION OF THE PREFERRED EMBODIMENTS

Figure 1:
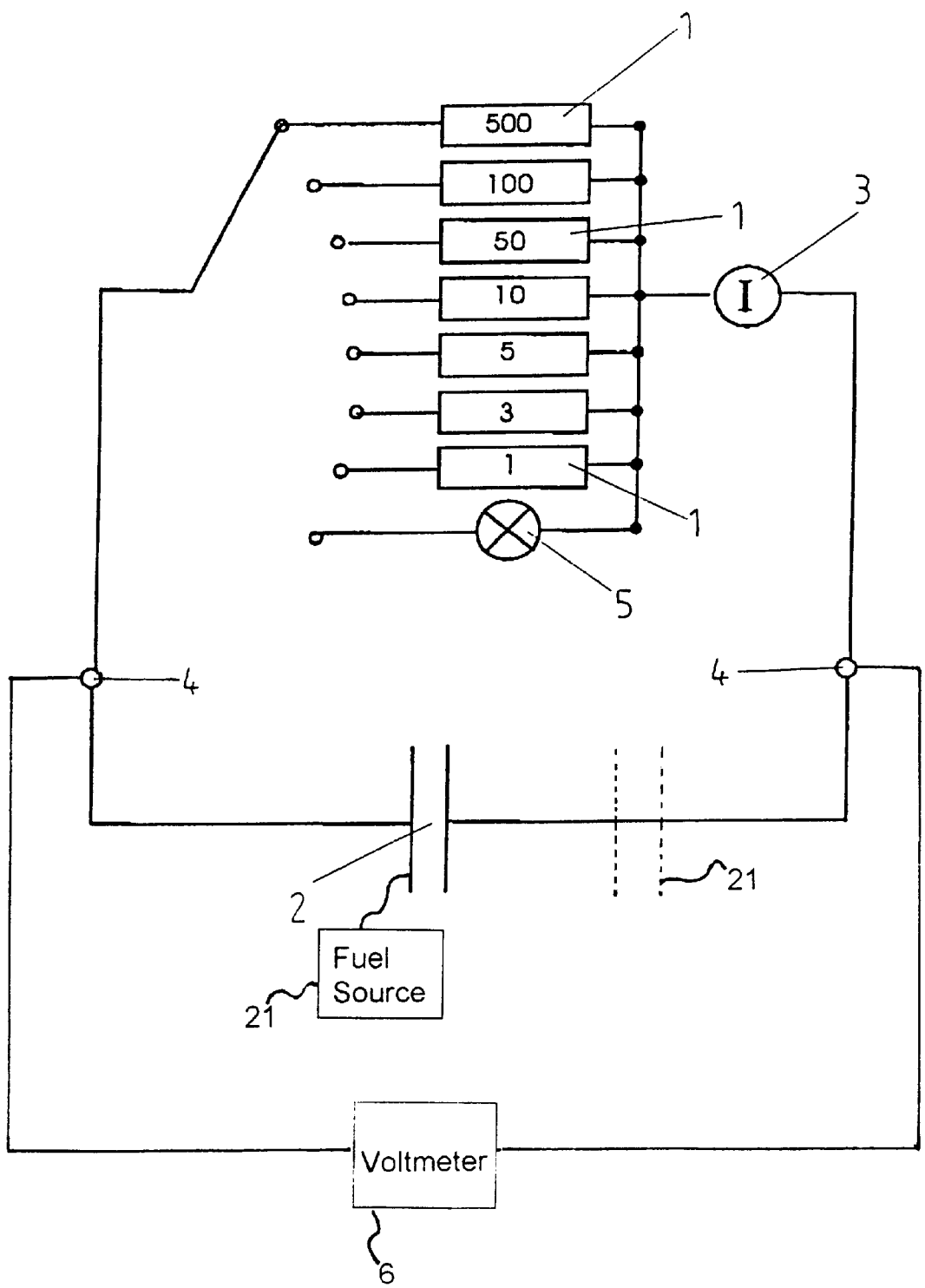
FIG. 1 is a block circuit diagram for experimentally measuring a characteristic and power of a fuel cell, for teaching and training purposes, according to the invention.

In all the figures of the drawing, sub-features and integral parts that correspond to one another bear the same reference symbol in each case. Referring now to the figures of the drawing in detail and first, particularly, to FIG. 1 thereof, there is shown a circuit for measuring characteristics of a fuel cell 2 according to the invention. The circuit contains seven resistors 1, which can be connected selectively, and which are in the range between 1 and 500 Ω, with resistances of 1, 2, 3, 5, 10, 50, 100 and 500 Ω. Such a number of resistors are selected such that there is at least one resistor between 0.5 and 5 Ω, one resistor between 5 and 50 Ω and one resistor between 50 and 500 Ω. The resistance values are quite sufficient to enable sufficiently accurate and meaningful measurements for training purposes to be carried out using an ammeter 3 connected in series with the respective relevant resistors 1 and the fuel cell 2, in order to determine a current level for the different resistors and thus to allow the characteristics of the fuel cell 2, that is to say the voltage to be plotted against the current level. The resistors 1 with such resistance steps can thus be connected as appropriate for the characteristic profile to be expected, and using a comparatively small number of such resistors, to allow a relatively accurate measurement to be made in a simple manner. A voltmeter 6 allows the fuel cell voltage to be measured in various load conditions. As can be seen from FIG. 1, the circuit has connections 4 for connecting the voltmeter 6 in parallel.

FIG. 1 shows an additional fuel cell 2' shown in dashed lines for providing an apparatus to measure the characteristics of a plurality of fuel cells 2, 2'. The fuel cell 2 has a fuel source 21 in a form of an electrolyzer to be connected to at least one of a solar module and a gas reservoir.

According to FIG. 2, the configuration shown in FIG. 1, supplemented by the voltmeter 6 and an electric motor 7 as well as a lamp 5 as further electrical loads, is fitted on a common board 8. The fuel cell 2 and the voltmeter 6 are connected by connecting sockets 9, 9' and 10, 10'. In order to protect the components installed on it, the board 8 can be accommodated in a housing 20. The individual resistors 1, of different sizes, as well as the electric motor 7 or the lamp 5 are driven via a rotary switch 11. The rotary switch 11 has two further switch positions, $C_o$ and $C_s$, that allow contacts to be opened (switch position $C_o$) in order to measure a no-load voltage, or to short-circuit the fuel cell 2.

The ammeter 3 has a first measurement range for a maximum current up to 0.5 amperes and a second measurement range with a maximum value of between 0.5 and 5 amperes is used to measure the current produced by the fuel cell 2. The voltmeter 6 likewise has a maximum of two measurement ranges, to be precise a first measurement range with a maximum voltage of up to 2 volts and a second measurement range with a maximum voltage of between 2 and 20 volts, is sufficient for voltage measurement.

The fuel cell 2 normally used for experimental purposes has a voltage of between 0.3 and 1 volt and supplies currents of up to 0.5 amperes. When a number of fuel cells are connected in parallel or series, the current and voltage values are correspondingly multiplied, so that test equipment with only one measurement range or a maximum of two measurement ranges in the order of magnitude mentioned above is completely sufficient to satisfy the requirements for experimental investigation of the fuel cell 2, for teaching and training purposes, and the handling of the experimental apparatus is in consequence considerably simplified. The trainee can thus concentrate on correct connection of the test equipment in the circuit.

In the experiment envisaged in the exemplary embodiment, and as shown in FIG. 2, maximum currents of 0.35 A are produced with a voltage of 0.65 V. In this case, the experiment can in each case be carried out in the first (lower) measurement range of the ammeter 3 and of the voltmeter 6 mentioned above, or alternatively only test equipment items which each have only one measurement range are required.

We claim:

1. An experimenting apparatus for fuel cell technology, comprising:

a fuel cell having a fuel source and operating characteristics including a current range, a voltage range, and a power range;

at least three and a maximum of 15 resistors having resistances selectively connected to said fuel cell and functioning as electrical loads, said resistances corresponding to expected operating loads of said fuel cell;

a lamp and an electric motor selectively connected to said fuel cell as further electrical loads;

an ammeter having a maximum of two measurement ranges corresponding to the power range, the voltage range and the current range of said fuel cell and connected to said fuel cell;

a voltmeter having a maximum of two measurement ranges corresponding to the power range, the current range, and the voltage range of said fuel cell and connected to said fuel cell, said resistors, said ammeter and said voltmeter provided for an experimental determination of the operating characteristics of said fuel cell;

a board having a rotary switch fitted on said board, said electrical loads, said further electrical loads and said ammeter being disposed on said board and electrically connected to one another, said electrical loads and said further electrical loads connected to said rotary switch and selectively connected to said fuel cell through said rotary switch; and said board having a short-circuit terminal and an open-circuit terminal connected to said rotary switch, said fuel cell to be switched to said short-circuited terminal through said rotary switch for testing a short-circuit condition, and said fuel cell to be switched to said open-circuit terminal being open contacts for measuring a no-load voltage.

2. The experimenting apparatus according to claim 1, wherein said ammeter has a first measurement range with maximum values of up to 0.5 amperes, and a second measurement range with maximum values between 0.5 and 5 amperes for measuring a current.

3. The experimenting apparatus according to claim 1, wherein said voltmeter has a first measurement range with maximum values of up to 2 volts, and a second measurement range with maximum values between 5 and 20 volts for measuring a voltage.

4. The experimenting apparatus according to claim 1, wherein said resistances of said resistors are in steps between 0.5 and 600 ohms.

5. The experimenting apparatus according to claim 1, wherein at least one of said resistances is between 0.5 and 5 ohms, at least one of said resistances is between 5 and 50 ohms, and at least one of said resistances is between 50 and 500 ohms and said resistors are disposed in a resistor chain.

6. The experimenting apparatus according to claim 1, wherein a number of said resistors is twelve resistors having resistance values of 0.5, 1, 2, 3, 5, 10, 20, 50, 100, 200, 400 and 600 ohms.

7. The experimenting apparatus according to claim 1, including:
    connecting sockets disposed on said board and connected to said fuel cell and said voltmeter.

8. The experimenting apparatus according to claim 1, including a housing containing said board for protecting associated components disposed on said board.

9. The experimenting apparatus according to claim 1, wherein said fuel source is an electrolyzer to be connected to at least one of a solar module and a gas reservoir.

10. The experimenting apparatus according to claim 1, wherein said fuel cell is one of a plurality of fuel cells and said two measurement ranges of said ammeter and said voltmeter are configured for the characteristics of said plurality of fuel cells.

* * * * *